United States Patent [19]

Dasgupta

[11] Patent Number: 5,926,101
[45] Date of Patent: *Jul. 20, 1999

[54] METHOD AND APPARATUS FOR ROUTING MESSAGES IN A NETWORK OF NODES WITH MINIMAL RESOURCES

[75] Inventor: Aninda V. Dasgupta, Croton-On-Hudson, N.Y.

[73] Assignee: Philips Electronics North America Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/558,447

[22] Filed: Nov. 16, 1995

[51] Int. Cl.$^6$ .................................................. H04Q 3/68

[52] U.S. Cl. ............... 340/825.02; 340/827; 340/825.53; 370/256; 370/389; 370/408; 375/202

[58] Field of Search ........................ 340/825.02, 826, 340/827, 825.52, 825.53, 825.54; 370/256, 255, 254, 351, 393, 400, 408, 357, 475, 389, 473; 375/202, 200; 395/829

[56] References Cited

U.S. PATENT DOCUMENTS

| | | | |
|---|---|---|---|
| 4,081,612 | 3/1978 | Hafner | 370/393 |
| 4,823,111 | 4/1989 | Tsuchiya et al. | 340/825.02 X |
| 5,030,948 | 7/1991 | Rush | 340/825.44 |
| 5,295,154 | 3/1994 | Meier et al. | 370/408 X |
| 5,394,436 | 2/1995 | Meier et al. | 375/202 |
| 5,473,602 | 12/1995 | McKenna et al. | 370/256 |
| 5,517,617 | 5/1996 | Sathaye et al. | 395/829 X |

OTHER PUBLICATIONS

Gary Lee Fultz, "Adaptive Routing Techniques for Message Switching Computer–Communication Networks." 1972. UCLA–ENG–7252. Doctoral Thesis, Computer Science Dept., UCLA.

G.L. Fultz, "Adaptive Routing Techniques for store–and–forward computer–communication networks." in Proc. Intl. Conf. Commun., 1971. pp. 39–1..39–8.

I. Gitman, et. al., "Routing in Packet–Switching Broadcast Radio Networks." IEEE Transactions on Communications, Aug. 1976. pp. 926–930.

J. McQuillan et al., "A Review of the Development and Performance of the ARPANET Routing Algorithm." IEEE Trans. on Communications, vol. COM–26, No. 12, Dec. 1978, pp. 1802–1811.

S. Boehm, et al., "Adaptive Routing Techniques for Distributed Communication Systems." The Rand Corporation, Memorandum, RM–4781–PR, 1966.

L. Kleinrock, "Communication Nets: Stochastic Message Flow and Delay." McGraw Hill, NY, 1964.

L. Kleinrock, "Models for Computer Networks." Proc. International Communication Conf., Univ. of Colorado, Boulder, pp. 21–9..21–16, Jun. 1969.

D. Bertsekas and R. Gallagher, "Data Networks." Prentice Hall, 1987.

M. Gerla, "Deterministic and Adaptive Routing Policies in Packet Switched Computer Networks." in Proc. 3rd Data Commun. Symp. Nov. 1973, pp. 23–28.

(List continued on next page.)

Primary Examiner—Brian Zimmerman
Assistant Examiner—William H. Wilson, Jr.
Attorney, Agent, or Firm—Anne E. Barschall

[57] ABSTRACT

A system that includes a multihop broadcast network of nodes that have a minimum of hardware resources, such as memory and processing power. The network is configured by gathering information concerning which nodes can communicate with each other using flooding with hop counts and parent routing protocols. A partitioned spanning tree is created and node addresses are assigned so that the address of a child node includes as its most significant bits the address of its parent. This allows the address of the node to be used to determine if the node is to process or resend the packet so that the node can make complete packet routing decisions using only its own address.

20 Claims, 17 Drawing Sheets

OTHER PUBLICATIONS

A. Belghith and L. Kleinrock. "A Distributed Routing Scheme with Mobility Handling in Stationless Multihop Packet Radio Networks." ACM SIGCOMM'83 Austin, Mar. 1983, pp. 101–108.

A. Merlin and A. Segall. "A Fail–safe Distributed Routing Protocol." IEEE Trans. on Commun., vol. 27, Sep. 1979, pp. 1280–1288.

B.M. Leiner, "A Simple Model for Computation of Packet Radio Network Commun. Performance." IEEE Trans. on Commun., vol. 28, Dec. 1980, pp. 2020–2023.

F. Tobagi and J. Brazio, "Theoretical Results in Throughput Analysis of Multihop Packet Radio Networks." Proc. ICC'84, May 1984, pp. 448–455.

F. Tobagi and J. Brazio, "Throughput Analysis of Multihop Packet Radio Networks Under Various Channel Access Schemes." Proc. IEEE INFOCOM, '83, Apr. 1983, pp. 381–389.

R.R. Boorstyn, et al., "Throughput Analysis of Multihop Packet Radio." Proc. ICC'80, Seattle, WA, 1980, pp. 13.6.1–13.6.6.

D. Comer, "Internetworking with TCPIP: Principals, Protocols, and Architechture." Prentice Hall, 1988.

H. Rudin, "On Routing and Delta Routing: A taxonomy and Performance Comparison of Techniques for Packet–Switched Networks." IEEE Trans on Commun., vol. Com. –24, No. 1., Jan. 1976, pp. 43–59.

Echelon Corp., "LonTalk™Protocol." LonWorks™ Engineering Bulletin, Apr. 1993.

Abstract –3,838,147 —Integer–linear–programming eigenvector–based approach for multipartitioning power system state–estimation networks, 1994 No Month.

Abstract –3,453,703—Forests, frames amd games. Algorithms for matroid sums and applications, 1992 No Month.

Abstract –3,447,256—A novel graph–theoretic texture segmentation algorithm, 1991 No month.

Abstract –3,200,225 —Tree partition algorithm for analysis of morphological structure of material, 1989 No month.

Abstract –2,919,915 —Computing signal delay in general RC networks by tree/link partitioning, 1989 No Month.

Abstract –1,766,624 —Parallel Algorithm For The Enumeration of the Spanning Trees of a Graph, 1984 No Month.

Abstract –1,751,792 —Network Flow Problem and Extremal Problems of Network Decomposition, 1984 No Month.

Abstract –1,097,827 —Use of Cluster Analysis Method for the Localization of Acoustic Emission Sources Detected During the Hydrotest of PWR Pressure Vessels, 1982 No Month.

Abstract –1,349,939 —Efficient Decentralized Two–Level Power System State Estimation Technique, 1993 No Month.

Abstract –509237 —The Characterization of Those Graphs Whose Spanning Trees Can Be Partitioned Into Two Isomorphism Classes, 1974 No Month.

Abstract –4,891,637 —Otten method for partitioning power system state estimation network, 1993 No Month.

Abstract –083363 —Combinatorial Programming: Methods and Applications, 1974 No Month.

Abstract –4,494,974 —Eigenvector approach for partitioning power system state estimation networks, 1993 No Month.

Abstract –1,815,475 —Connection of flow problems with extremal problems of network decomposition, 1981 No Month.

Abstract—DIALOG, File 8, Patents U.S. Forecasts, 1971–1995/Jun.

Abstract—DIALOG, File 8, Patents Compendium Plus, 1970–1995/Sep.

Abstract—DIALOG, File 6, NTIS, 1964–1995/Sep.

Abstract—DIALOG, File 35, Dissertation Abstracts Online, 1861–1995/Aug.

Abstract—DIALOG, File 239, MathSci, 1940–1995/Aug.

Abstract—DIALOG, File 239, STRENS Recreational Mathematics Subfile No Month/Year.

Abstract—DIALOG, File 2, INSPEC, 1969–1995/Aug.

Two printouts of abstract obtained during a computerized prior art search, Aug. 21, 1995.

Boehm et al., *Adaptive Routing Techniques for Distributed Communications Systems*, Rand Corporation Memorandum (RM–4781–PR, Feb. 1966.

400 INSERT PKT

| 38(h) | X | ffff(h) | 51(h) | 01(h) | ad30(h) | 3d(h) |
|---|---|---|---|---|---|---|
| FLAG (1) | ID (1) | ADDRESS (2) | CMD (1) | HOP-CNT FOR FHC (1) | ADDRESS OF SENDING NODE (2) | CHECKSUM (1) |

FIG. 22

401 HEAR_INSERT PKT

| 50(h) | X | 0000 | 52(h) | ad30(h) | 0320(h) | 04(h) | a0(h) |
|---|---|---|---|---|---|---|---|
| FLAG (1) | ID (1) | LOGICAL ADDR OF NCN (X) | CMD (1) | ADDR OF INSERT SENDING NODE (2) | ADDR OF SENDING NODE (2) | HOP-CNT OF SENDING NODE FROM NCN (1) | CHECKSUM (1) |

FIG. 23

402 ECHO PKT

| d0(h) | X | 03abc | 53(h) | X | 3b(h) |
|---|---|---|---|---|---|
| FLAG (1) | ID (1) | LOGICAL ADDR OF DEST. (X) | CMD (1) | DATA (1) | CHECKSUM (1) |

FIG. 24

SQUEAL PKT

| 70(h) | X | 0000 | 54(h) | 04(h) | 3abc(h) | 30(h) |
|---|---|---|---|---|---|---|
| FLAG (1) | ID (1) | ADDR OF NCN (2) | CMD (1) | HOP-CNT FOR FHC (2) | LOGICAL ADDR OF SENDER (X) | CHECKSUM (1) |

FIG. 25

METHOD AND APPARATUS FOR ROUTING MESSAGES IN A NETWORK OF NODES WITH MINIMAL RESOURCES

BACKGROUND OF THE INVENTION

1. Field of the Invention

The present invention is directed to a system that determines a configuration for a network of nodes and establishes a communication protocol for the nodes and, more particularly, to a system that allows wireless, multihop broadcast communication between and among a network control node and nodes of the network using node addresses that are based on a partitioned spanning tree allowing simple comparisons to a node's own address to make routing decisions and allowing a network of low cost, resource starved (with minimal memory and processing power) nodes to be efficiently connected.

2. Description of the Related Art

Today's typical networks, particularly those used for real time control of modern buildings, include wire connected nodes that are installed when the building is built. In these systems the networks are used to control lighting heating/cooling, elevators, etc. The nodes of the network are typically microcomputers with substantial amounts of memory and other resources. Because these systems are wired and have relatively powerful nodes, they are expensive and generally only justified in the largest of buildings. In addition, they are generally not suitable for retrofitting older buildings that can be the most suitable subjects for power usage control systems in particular.

What is needed is a network of very low cost nodes, that is, nodes that have minimal resources or resource starved nodes, that are wirelessly connected together and thus suitable for small to medium size buildings and for retrofitting older buildings.

In typical network based control systems the nodes of a data communication network exchange units of information amongst themselves. These units are commonly referred to as packets, frames or cells. In a multi-hop network, a node does not have a direct communication link with every other node of the network, and a packet may need to be forwarded by intermediate nodes that lie in a communication path from the source node to the destination node. Depending upon the type of network and its features, this function of routing of packets may involve one of the following at the intermediate nodes: 1) the selection of one of many links leaving the intermediate node (e.g., in a point-to-point multi-hop network like the Internet), or 2) a decision about whether or not to forward (retransmit) a received packet (e.g., in a wireless multi-hop broadcast network where all nodes share a common channel). Most of the popular routing techniques used in data communication networks utilize routing tables or decision tables to make routing decisions in an operation in which an address of a message is used to access the table to make a routing decision or selection. A routing table in an intermediate node typically indicates the best outgoing link or shortest path to the destination node where the packet is destined. Decision tables help in deciding whether or not to further forward a received packet. However, such tables take up space in a node's memory. For example, in a network of 256 nodes, about the size for a typical medium size building, if each node were to store a simple routing table, it would need at least 512 bytes to indicate to which node to forward a packet. A decision table in such a 256 node network may take 288 bytes, 256 bytes for the addresses of nodes, and 32 bytes to indicate using bits whether or not to forward a packet destined for each node in the table. In a network of resource-starved nodes of the low memory type, there is not enough memory available to store such tables. Memory, in such nodes, is shared between data communication functions and system or application specific functions. Thus, different routing techniques need to be devised. These routing methods not only should use very little RAM, but should also be efficient in transporting packets from source to destination with acceptable delays.

What is needed is a network of nodes that have minimal resources, particularly memory and a routing protocol that will operate with such nodes.

SUMMARY OF THE INVENTION

It is an object of the present invention to provide a system that connects a network of low cost, minimal resource nodes wirelessly.

It is also an object of the present invention to provide a system that connects nodes using broadcast communication techniques.

It is an additional object of the present invention to provide a network that does not require that routing tables be stored in the nodes.

It is another object of the present invention to provide a routing protocol that is suitable for networks of resource starved nodes.

It is also an object of the present invention to provide a system that configures a network of nodes.

It is a further object of the present invention to provide a system that allows small to medium size buildings to be equipped and allows older buildings to be retrofitted with low cost networks.

The above objects can be attainted by a system that includes a multihop, wireless broadcast network of nodes that have a minimum of hardware resources, such as memory and processing power. The network is configured using a partitioned spanning tree and node addresses are assigned so that the address of an intermediate node can be compared to the destination address of a packet to make complete packet routing decisions.

These, together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 4, 5, 6, 10, 11, 13, 19, 20 and 22–25 depict message packets;

DESCRIPTION OF THE PREFERRED EMBODIMENTS

Figure 1:
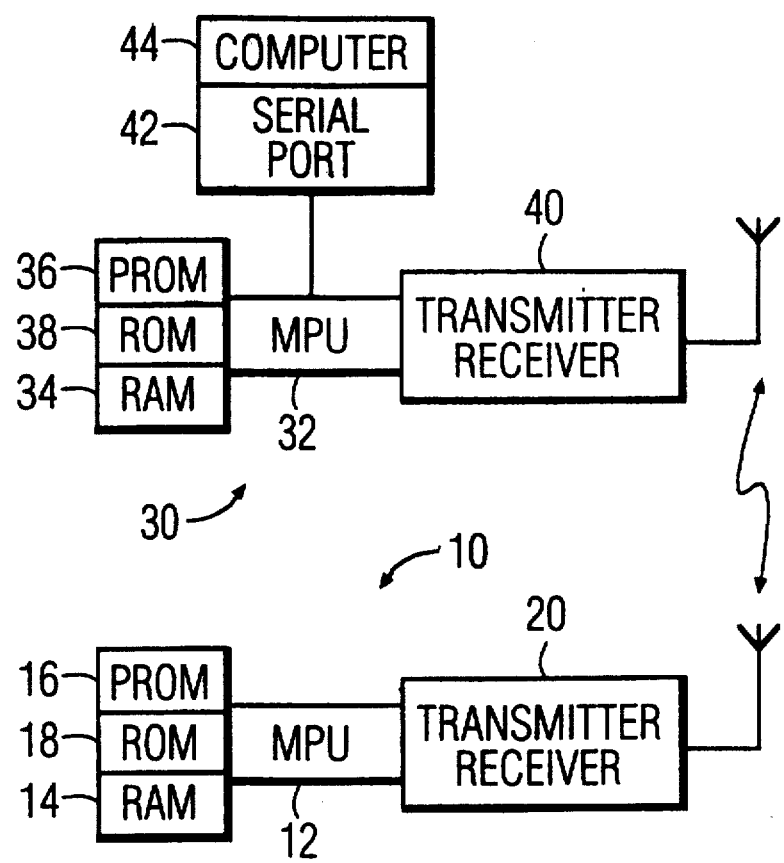
FIG. 1 depicts nodes of a network according to the present invention.

The present invention is directed to a network of low cost nodes suitable for performing simple functions, such as the control of the light level in a single room, and where each node can be incorporated into the device being controlled, such as a light switch. The nodes of such a network are "resource starved". A node is said to be resource starved if it has insufficient memory to store routing information like routing tables, and it has insufficient processing power to compute a "best route" for an outgoing packet or message based on information like shortest path, network congestion, link control, etc. The preferred embodiment includes network nodes 10, such as illustrated in FIG. 1, that each include a low cost, four or eight bit microcontroller processing unit (MCU) 12, such as the Motorola 68HC11 microcontroller, that includes a very limited amount of on chip RAM 14 (on the order of 32 bytes), PROM 18, preferably of the EEPROM type, for holding programmable but nonvolatile information such as the node address (that is, about 4 bytes), and ROM 18 (about 1 or 2K bytes) holding the control and network routing programs or software. Each node 10 also includes a conventional wireless transmitter/receiver 20 that allows communication with other nodes of the system. The transmitter/receiver 20 is a low power device that typically transmits only a few dozen feet, such as the distance of one the size of one to three or so rooms of a building. Because the nodes have minimal resources, such as RAM memory, the nodes cannot hold sophisticated routing programs that depend on routing or decision tables. To manage the network and determine network configuration an intelligent and relatively powerful node called a network control node (NCN) 30 is provided. The NCN 30 may include the same version of the MPU 32, RAM 34, PROM 36, ROM 38 and transmitter/receiver 40 as the nodes 10 and also includes a conventional serial port 42 connected to a conventional computer 44, such as a PC or workstation, that includes the conventional disk storage and I/O devices suitable for performing network and system control, such as building lighting control.

The NCN 30 is responsible for implementing a Partitioned Spanning Tree (PAST) routing protocol. The partitioned spanning tree routing protocol of the present invention is applicable to almost any type of multi-hop network and uses no routing or decision tables. It is, however, best suited for networks of resource-starved nodes (with little processing power and memory) and relies on the availability of a network control node that has enough processing power and memory to assign addresses to the other nodes and to initialize the network at startup.

Figure 2:
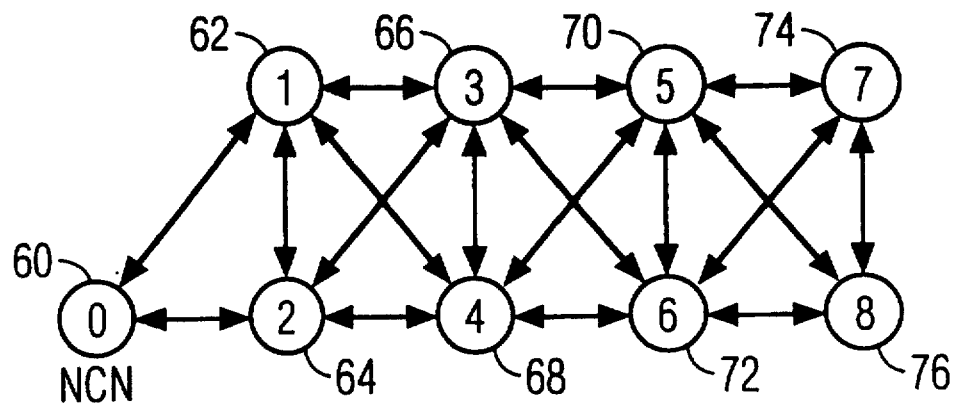
FIG. 2 depicts a network of wireless multihop nodes.

For a better understanding of the protocol, we will consider a network, as illustrated in FIG. 2, where end-to-end communication takes place between the NCN 60 and the resource-starved nodes 62–76, and back, but not between two resource-starved nodes, such as 70 and 72, other than for the exchange of packets for relaying them on towards a destination node. To describe the operation of the protocol, we consider the case of a broadcast-channel network where each node is within direct wireless communication range of a few other nodes of the network, for example, node 68 is in range of nodes 62, 64, 66, 70 and 72 but no other nodes. Thus, there exist overlapping neighborhoods (the neighborhood of node 66 overlaps that of node 68), each centered around a transmitter, within which may lie some neighbor nodes of the transmitter.

All nodes in the network use a common broadcast channel. Collisions are avoided using a conventional CSMA (carrier sense multiple access) protocol by requiring each transmitter to monitor the channel and transmit only if there is no traffic. A node that lies in the intersection of the neighborhoods of two nodes that are out of hearing range from each other may receive invalid data if the two neighbor nodes transmit simultaneously thinking that the channel is free. An implicit hop-by-hop (IHBH) acknowledgment scheme is used to recover from such collisions. This IHBH acknowledgment scheme is discussed later.

Packets travelling from a resource-starved node, such as 74, to the NCN 60 will be said to be travelling upstream and those travelling from the NCN 60 to a resource-starved node will be said to be travelling downstream. Each resource-starved node may be manufactured with a unique identifier, called its physical ID or the ID may be assigned to a node manually during installation.

Figure 3:
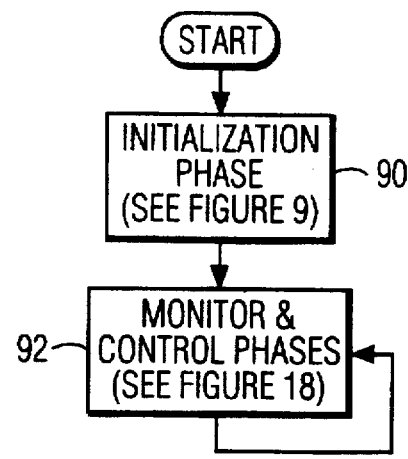
FIG. 3 is a flowchart of the process performed by a network control node.

When the nodes 62–76 are first turned on they start up in an initialization phase in which they await a communication from the NCN 60. The network control node (NCN) 60, which has large processing power and memory capacity, first, in the initialization phase 90 (see FIG. 3), based on information input by the user as to the number of nodes in the network, gathers information from the resource-starved nodes 62–64 to form a complete and accurate representation of the network in the form of a graph, such as that of FIG. 2. The information needed is an indication of which nodes can hear each other, that is, a list of what nodes are in broadcast range of what other nodes. The information is obtained by broadcasting initialization messages using a flooding with hop counts protocol (to be discussed later) to all the nodes of the network. This broadcast proceeds level by level such that nodes in the middle levels of the network broadcast to those further down. This allows each node to record the node that is its parent node, that is, the node from which it received the first initialization broadcast. The nodes respond with the needed information via a response message returned using a parent routing protocol (to be discussed later). The response messages also indicate what other nodes besides the parent the node can hear. Each arc of the graph represents a direct link between the two nodes that it connects. The graph is then partitioned into a spanning tree. The nodes are then assigned logical (partitioned spanning tree—PAST) addresses in such a way that the path that a packet is to take is uniquely identified by the address of the destination-node or sending-node, for packets travelling downstream or upstream, respectively, from the NCN 60. In this addressing scheme an intermediate node, such as node 64, that receives a packet simply examines the address of the destination node (for packets travelling downstream), or the address of the node sending the packet (for packets travelling upstream) by comparing it to the address of that intermediate node. From the address comparison alone, the intermediate node is able to tell if the intermediate node lies in the path that the packet is to take. If the intermediate node is in the path, it forwards the packet; otherwise the packet is discarded. Once the addresses are assigned the NCN 60 enters a monitoring and control phase 92 in which messages concerning events and commands are passed through the network using the PAST routing protocol. The details of the phases of the NCN 60 operation will be discussed in more detail later. However, before discussing the details of the initialization phase it is helpful to understand two routing protocols utilized during the initialization phase: 1) flooding with hop counts (FHC) and 2) parent routing (PA). These two protocols will be discussed below with respect to FIGS. 7 and 8. But first the structure of each packet transmitted in the network using the protocols will be explained.

The structure of the packets used in the discussions below is given in FIG. 4. Each packet 100 contains a "Flag" byte 102 at a fixed location. This byte 102 has the following bit-fields (with the least significant bit on the right): Bits 0 and 1—reserved for future use; Bit 2—packet priority: 1 indicates "urgent" and 0 indicates a "non-urgent" packet; Bits 3 and 4—addressing: 11 indicates that the packet is a "broadcast" packet, i.e., the packet is to be processed by every node in the network; 10 indicates that the packet is a "multi-cast" packet, i.e., multiple nodes in the network, identified by a group address, are to receive and process the packet; 01 indicates that the packet is a "unicast" packet and is destined for only one node; Bits 5 and 6—routing type: 11 indicates that the packet is to be routed using the parent routing scheme; 10 indicates that the packet is to be routed using the FHC routing protocol; and 01 indicates that the PAST protocol is to be used; and Bit 7—direction of travel: 0 indicates that the packet is travelling upstream to the NCN; 1 indicates that the packet is moving away from the NCN. A unique packet ID is provided in the second byte 104. The next field 106 of the packet 100 is a variable length field that includes the logical address of the destination (or source) node. The fourth field 108 includes a one byte command. The next field 110 is a variable length data field. The last field 112 of the packet 100 is a checksum field used for error checking.

Figure 4:
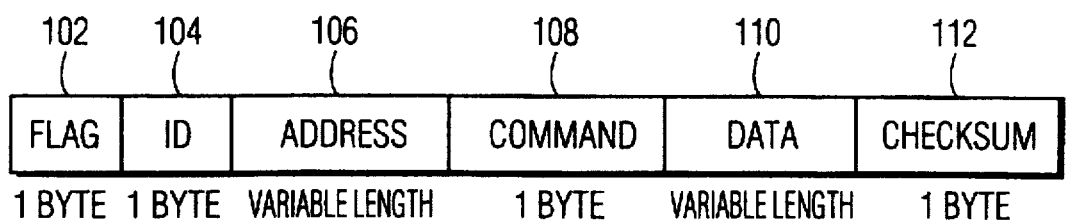
Figure 5:
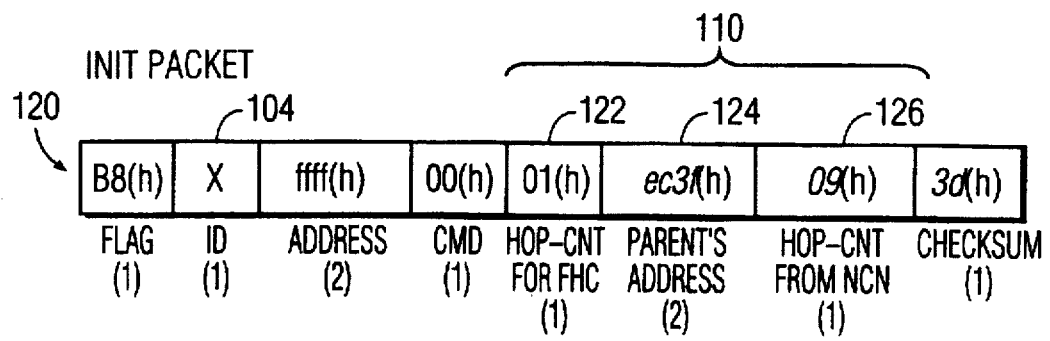
Figure 6:
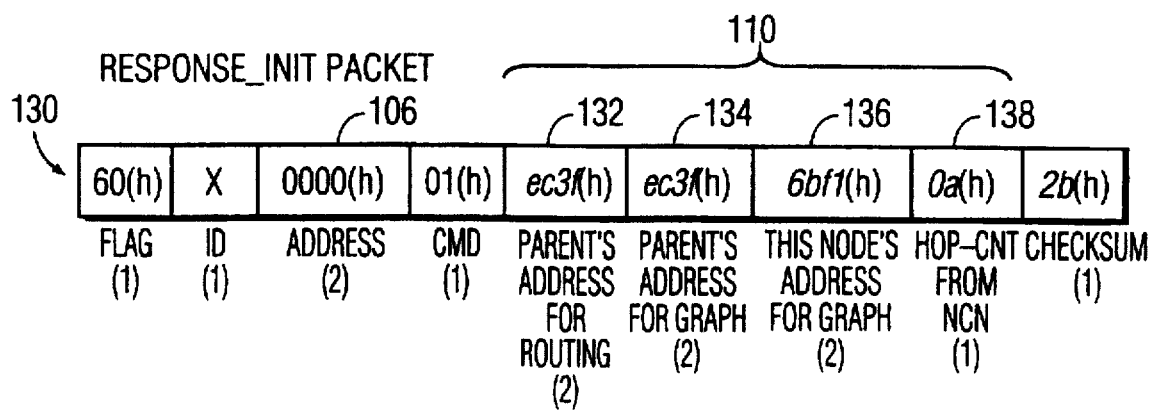

The initialization phase uses two versions of the packet 100 of FIG. 4 which are shown in FIGS. 5 and 6. The initialization or INIT packet 120 of FIG. 5 is only used during the FHC downstream routing initialization process (see FIG. 7). The network control node (NCN) 60 broadcasts packet 120 of FIG. 5 to all nodes that are within direct communicating range of the NCN 60. The flooding with hop counts (FHC) routing scheme is used to broadcast (the Addressing bits in the Flag byte are set to 11) the packet 120. Each packet 120 contains the physical ID 104 of the sending node. In the data field 110 the hop counter 122 for FHC is set to one, so that only immediate neighbors of the sending node process the packet, but do not forward the packet further onwards (as described in more detail with respect to FIG. 7). The address 124 of the node sending the packet is included in the data field 110. The packet 120 also contains the number of hops 126 that the sender of the INIT packet is away from the NCN. In the example of FIGS. 5 and 6, the INIT packet 120 is sent from a node whose ID is ec3f(hex), and is received by a node whose ID is 6bf1(hex). The address field 106 in a packet is always set to ffff(hex) as the hop count field 122 ensures that the INIT packet 120 does not propagate beyond one hop away. The response or RESPONSE_INIT packet 130 of FIG. 6 is only used in the upstream parent routing process (see FIG. 8). The packet 130 has the address field 106 set to the address of the NCN 60 (0000 hex). Within the data field 110 a field 132, called the parents address for routing field, is included, the contents of which gets replaced by the ID of the parent node of every intermediate node that receives that packet 130 and forwards (broadcasts) it. The second field 134 includes the parent node address for the network graph that will be built by the NCN 60. The address of the initial node sending the RESPONSE_INIT packet 130 is stored in the next field 136 and the distance in hop count of the initial node from the NCN is stored in the next field 140.

Figure 7:
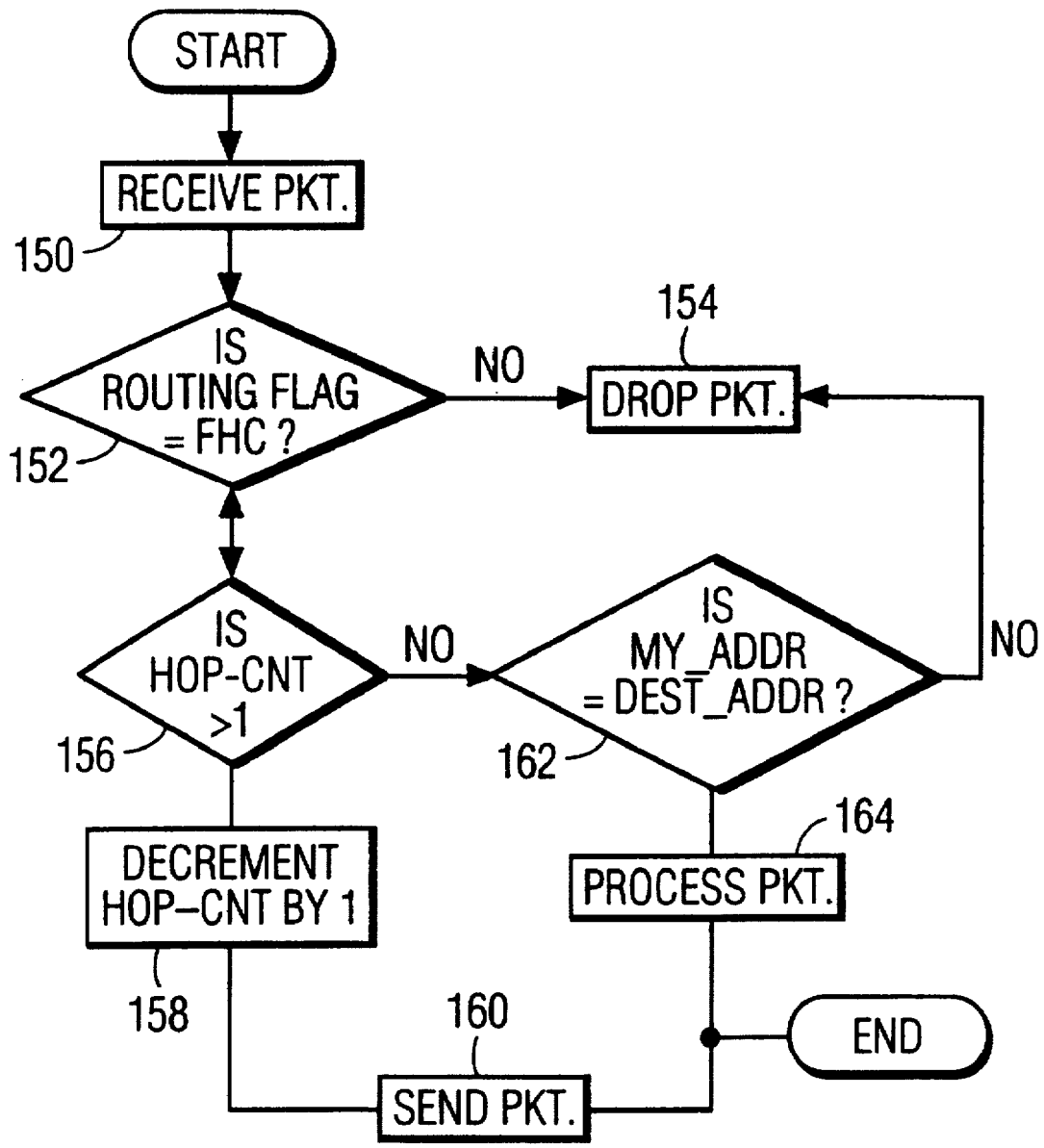
FIG. 7 is a flowchart of a flooding with hop counts process.

The flooding with hop counts (FHC) routing scheme, as illustrated in FIG. 7, uses a maximum hop-counter (field 122) in each INIT packet 120 to indicate the maximum number of hops that the packet can take as it propagates from the source node to its destination in a broadcast network. The source node has to know the exact (or minimum) number of hops required before the packet will reach its destination. A unique packet identifier is also inserted in the packet. Every intermediate node, for example node 64, that receives 150 a packet determines 152 whether the packet is an FHC packet and if not discards 154 the packet. Otherwise the node examines 156 the hop counter and decreases 158 it by one. If the counter would reach zero, the packet is not retransmitted. Otherwise the intermediate node broadcasts 160 the packet for neighboring nodes to hear. The packet's identifier is also recorded for a reasonable duration of time so that if the packet is received again from a neighboring node, the packet is discarded. The packet is sure to reach the destination node before the hop count reaches zero, provided no nodes fail. This method of routing a packet can be used for packets travelling upstream as well as downstream from the NCN. The destination node's physical ID, which is specified in the packet, is used by the destination node to recognize 162 that the packet is to be processed 164 and not forwarded further on. It is easy to see that this routing scheme is very inefficient as multiple copies of the packet may exist in disconnected parts of the network. Some copies of the packet may travel away from the destination node, thus wasting network resources. Additional details of this routing scheme can be obtained from Boehm, S. P. and P. Baran, "Digital Simulation of Hot-Potato Routing in a Broadband Distribution Communication Network," RAND Corporation, Memorandum RM-3103-PR, August, 1964. FIG. 7 provides a generalized description of the operations performed during routing by the flooding with hop counts and the performance of this routing protocol within the processes of the present invention at the control (60) and resource starved (62–76) nodes will be discussed in more detail with respect to FIGS. 9 and 12.

Figure 8:
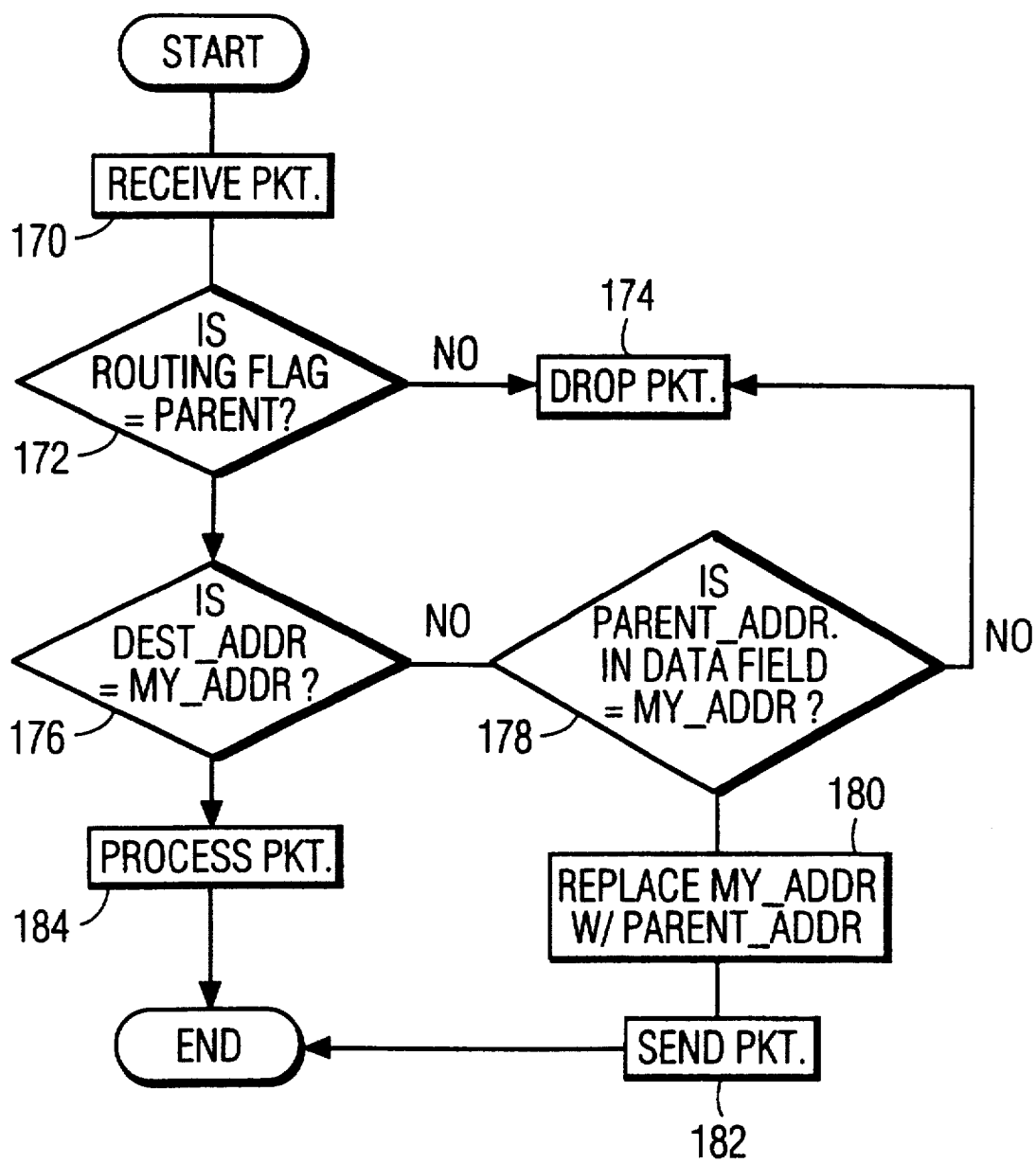
FIG. 8 is a flowchart of a parent routing process.

The parent routing scheme illustrated in FIG. 8 is useful only for routing packets that are travelling upstream to the NCN 60. Each node in the network stores the physical ID of a node that is within direct communicating range, and is closer to the NCN by at least one hop. The node whose ID is stored is referred to as the parent node. The source node inserts into an outgoing RESPONSE_INIT packet 130 the ID of its parent node and broadcasts the packet. An intermediate node that receives 170 a packet 130, examines 172 the routing flag to ensure that the type is parent routing and drops 174 the packet if it is not the correct type. If it is the correct type the node examines 176 the destination address contained in it. If the address is not that of the intermediate node, the parent address is examined 178. If the parent address is the address of the intermediate node, the address is replaced 180 with that of the parent node of the intermediate node, and the packet is transmitted 182. This continues until the destination node (the NCN 60) receives the packet 130 and processes 184 the RESPONSE_INIT packet 130. Thus, the packet 130 travels to the NCN by hopping from one node to its parent which is one hop closer to the NCN. This method of routing is more efficient than flooding with hop counts (FHC), as only those nodes whose IDs appear in the packet, relay the packet onwards. FIG. 8 provides a generalized description of the operations performed during parent routing and the performance of this routing operation within the processes of the present invention at the control (60) and resource starved (62–76) nodes will be discussed in more detail with respect to FIGS. 9 and 12.

Figure 9:
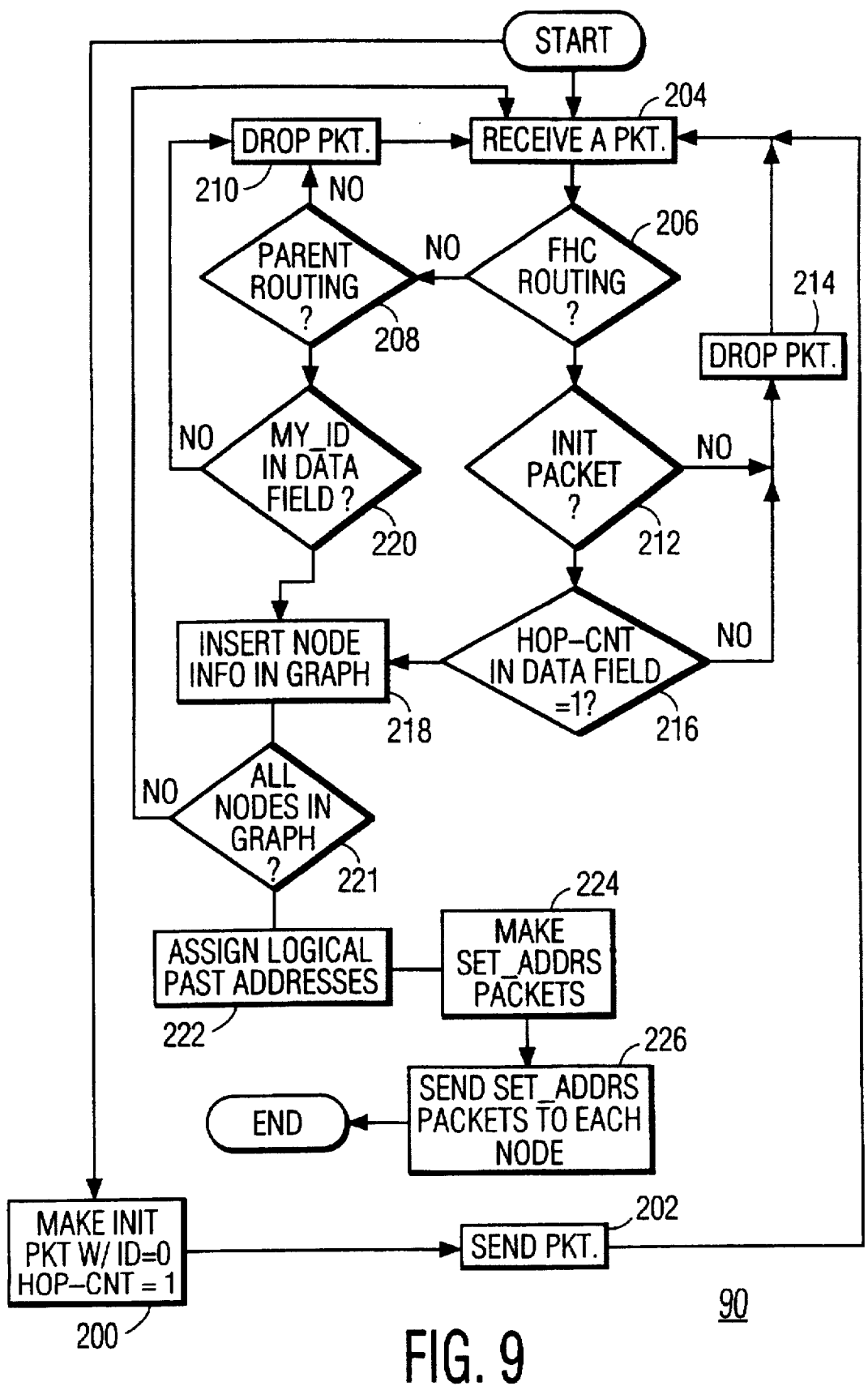
FIG. 9 depicts an initialization process of the network control node.

The network control node (NCN) 60 during the initiation phase 90, as illustrated in FIG. 9, after the user has indicated the number of nodes in the network, starts by creating 200 an initialization packet 120, as illustrated in FIG. 5, with the ID (field 104) of 0 and an FHC hop count (field 122) of 1. This packet is then sent 202. The NCN 60 then waits until a packet is received 204. The NCN 60 then determines 206 if the routing type is FHC. If not a determination 208 is made as to whether the routing method of the packet is the parent routing type. If not the packet is discarded 210. If the packet was routed by FHC routing a determination 212 is made as to whether it is an initiation packet 120. If not the packet is discarded 214. If it is an initiation packet 120 a determination 216 is made as to whether the hop count is 1. If so, a node is inserted 218 into a graph of the nodes of the network, such as that of FIG. 2. This insertion operation 218 also occurs if the NCN receives and recognizes 220 a parent routed response packet 130 that includes the NCN node ID. If the NCN determines 220 that all the nodes for the graph have not been entered into the graph, that is, when the number of nodes of the network specified by the user does not equal the number of nodes in the graph, the system returns to wait 204 for another packet. If the graph is complete, the NCN 60 assigns 222 logical partitioned spanning tree (PAST) addresses to the nodes, which will be discussed in more detail later. Once the logical addresses are assigned 222, the NCN 60 then informs each node of its address. This is done by constructing 224 SET_ADDRS packets 240 (see FIG. 10) and sending 226 them to the nodes 62–76.

Figure 10:
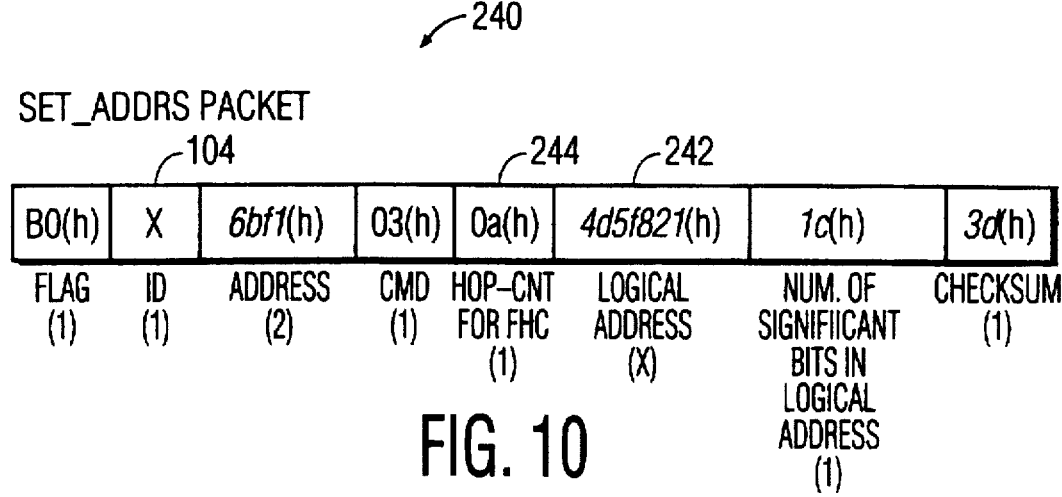
Figure 11:
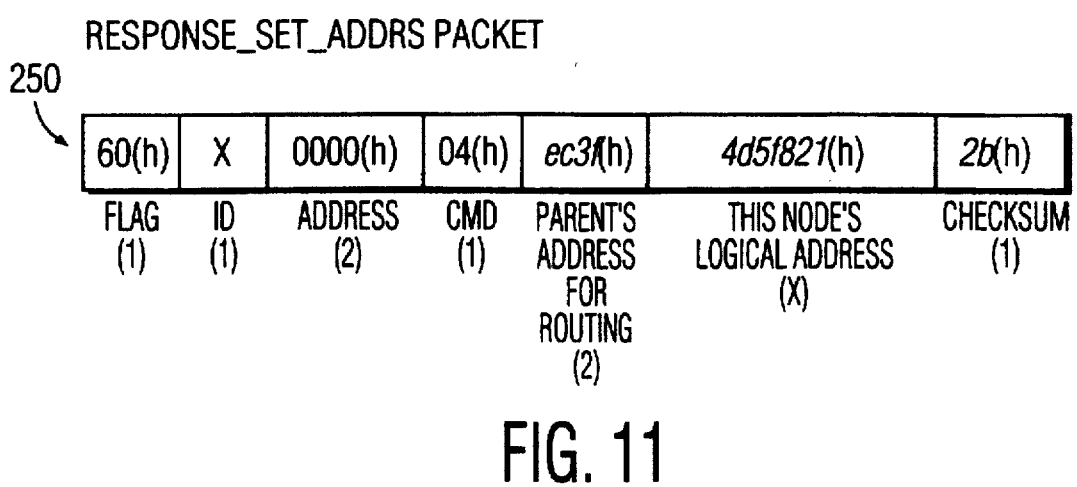

Each SET_ADDRS packet 240, as illustrated in FIG. 10, contains the physical ID 104 of the destination node, and the logical PAST address 242 assigned to the destination, so that the destination node can accept the packet and store its logical PAST address. The packets 240 are routed using the flooding with hop counts previously discussed. The exact hop count 244 from the NCN to each node is known as this information was part of the RESPONSE_INIT packet received from the destination node. The packet 240 also contains an indication 246 of the number of bits in the logical address. A node that receives a SET_ADDRS packet 240 confirms the reception of its PAST address by sending a RESPONSE_SET_ADDRS packet 250 (see FIG. 11) to the NCN 60. These packets 250 are routed using the parent routing scheme.

Figure 12:
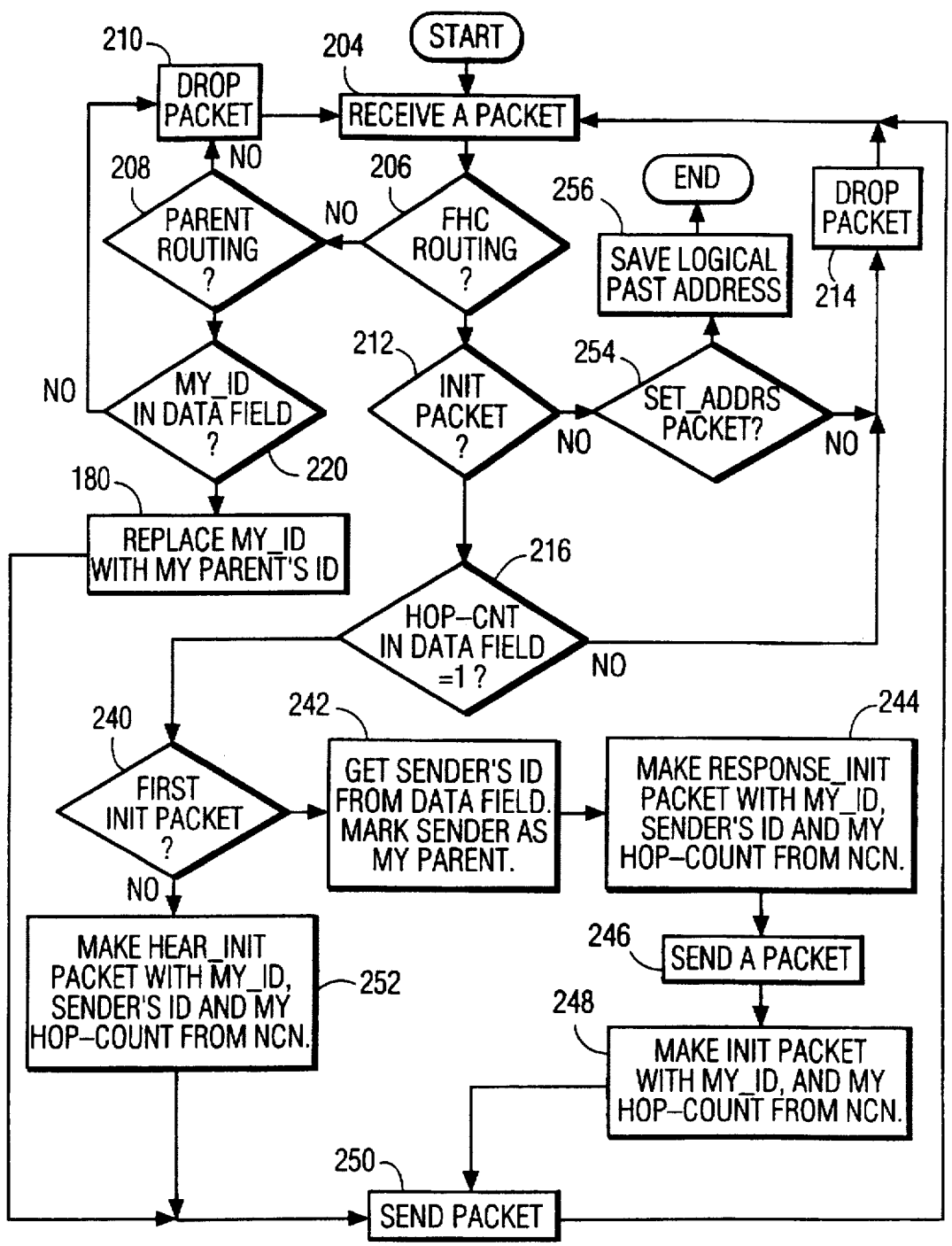
FIG. 12 depicts an initialization process of a network node.

The operations of the resource starved nodes 62–76 during the initialization phase in determining the type of routing are the same as in the NCN 60 as illustrated by the reference numerals of the same operations of FIG. 12. After the hop count check 216 is made, each node that receives 240 an INIT packet 120 for the first time, saves the physical ID of the sender of the packet 120 and marks 242 the sender as its parent node. Additionally, the receiving node adds one to the value in the packet that gives the number of hops from the NCN 60 to the sender of the INIT packet 120, and stores the result as the number of hops that the receiving node is away from the network control node (NCN) 60. The receiving node then makes 244 and sends 246 a RESPONSE_ INIT packet 130 to the NCN 60 to notify the NCN 60 that the receiving node is within direct communicating range of the node that sent the INIT packet 120 (i.e., the parent node). RESPONSE_INIT packets 130 are routed using the parent routing scheme previously discussed. Thus, to begin with, each RESPONSE_INIT packet 130 contains the physical ID of the parent node of the node that constructs the packet, the physical ID of the node that sends the response packet 130, and the number of hops it is away from the NCN 60. The node then broadcasts this packet, but only the parent node, whose ID appears in the packet, retransmits the packet after replacing its ID with that of its own parent. Thus a RESPONSE_INIT packet 130 is first forwarded by the sender of the initialization packet 120 that caused the generation of the packet 130. Upon receiving a RESPONSE_INIT packet 130, the NCN 60 creates an entry in a graph to represent the source node that sent the RESPONSE_INIT packet 130. An arc is constructed in the graph, actually pointers in a linked list data structure, to connect the entries representing the sender of the packet 130 and the node whose packet 120 caused the sending of the packet 130. The number of hops from the NCN 60 to the sender (source) of the packet 130 is also saved.

A node that receives a packet 120 for the first time, in addition to sending 246 a packet 130 to the NCN, also constructs 248 (see FIG. 12) an INIT packet 120 with a hop count of 1 and an ID of ffff(hex) and broadcasts 250 it for all immediate neighbors to hear.

Figure 13:
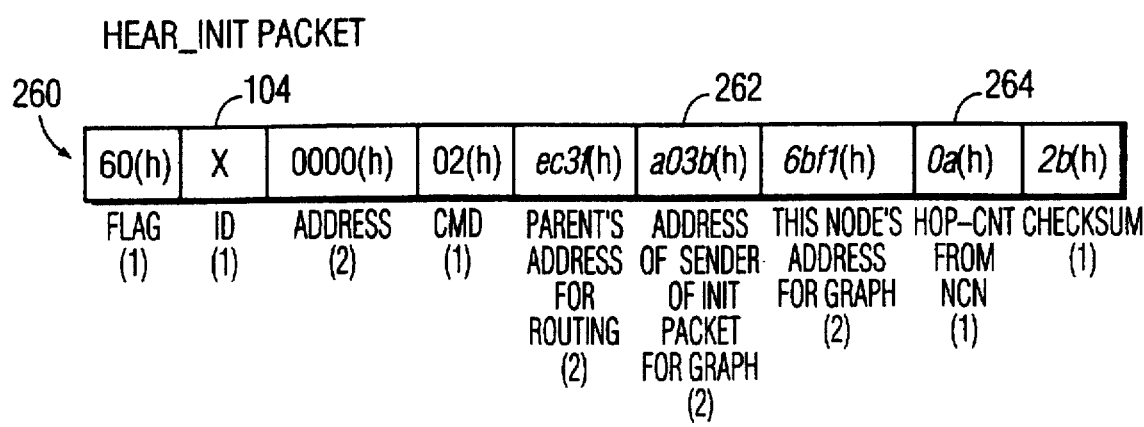

A node that receives an INIT packet 120 subsequent to the first one, does not save the physical ID of the sender of the packet 120 as a parent. It also refrains from constructing and broadcasting an initialization packet 120. The node does, however, construct 252 an HEAR_INIT packet 260. This packet 260 is similar in structure and purpose to a RESPONSE_INIT packet 130 and is illustrated in FIG. 13. However, a HEAR_INIT packet 260 does not travel via the sender of the INIT packet 120 that caused the generation of the packet 260. A HEAR_INIT packet 260 travels by the same path that the first RESPONSE_INIT packet 130 took to reach the NCN 60 from the node sending the HEAR_ INIT packet 260. The packet 260 also causes the NCN 60 to insert an arc in the graph to connect the sender of the packet 260 and the sender of the packet 120 that caused the generation of the packet 260.

Figure 21:
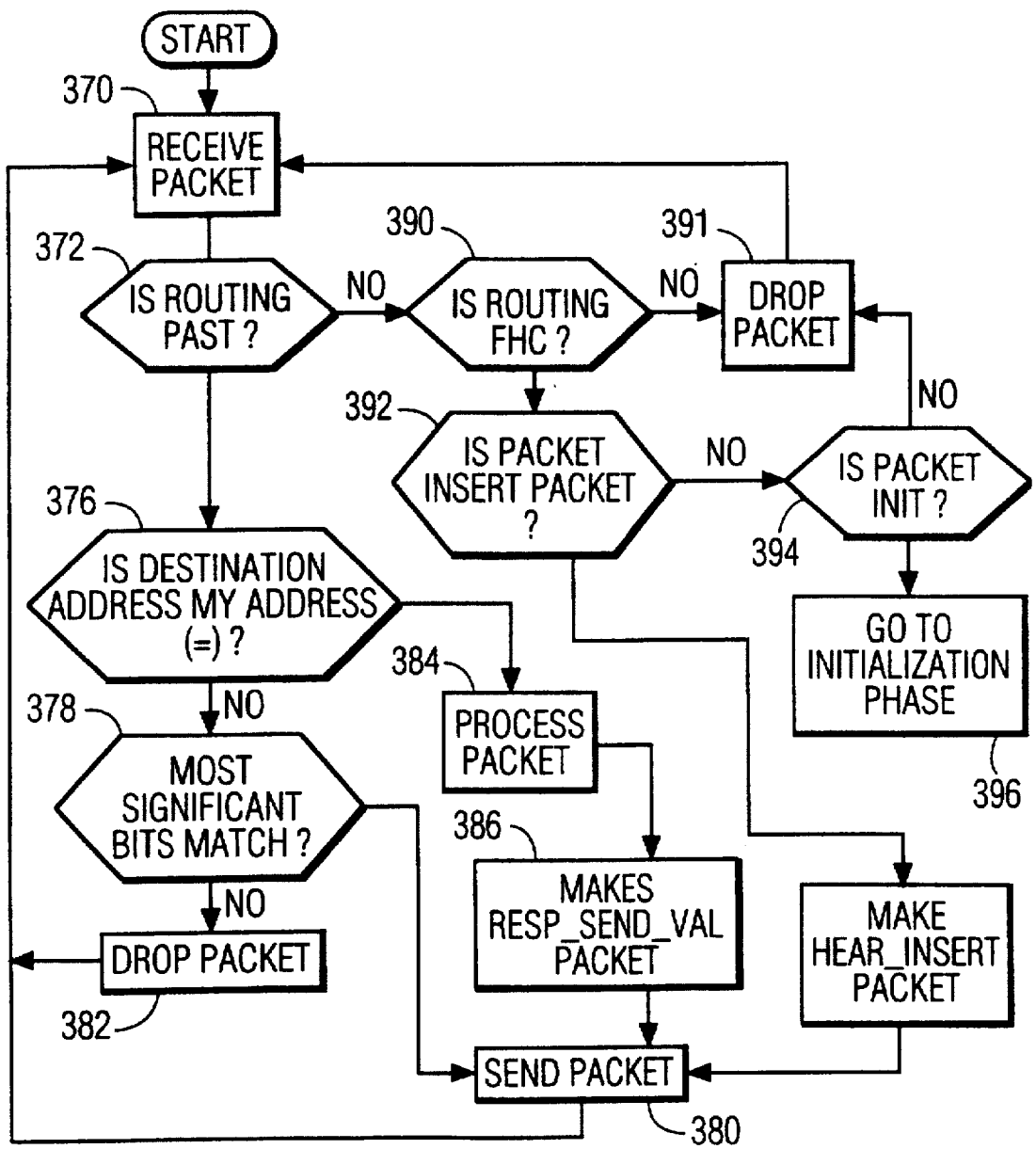
FIG. 21 is a flowchart of the process performed by the network nodes after network initialization.

If the packet received is determined 254 (FIG. 12) to be the address setting packet for this node, the logical address is saved 256 and the network communication and control phase which will be described with respect to FIG. 21 is entered.

Figure 14:
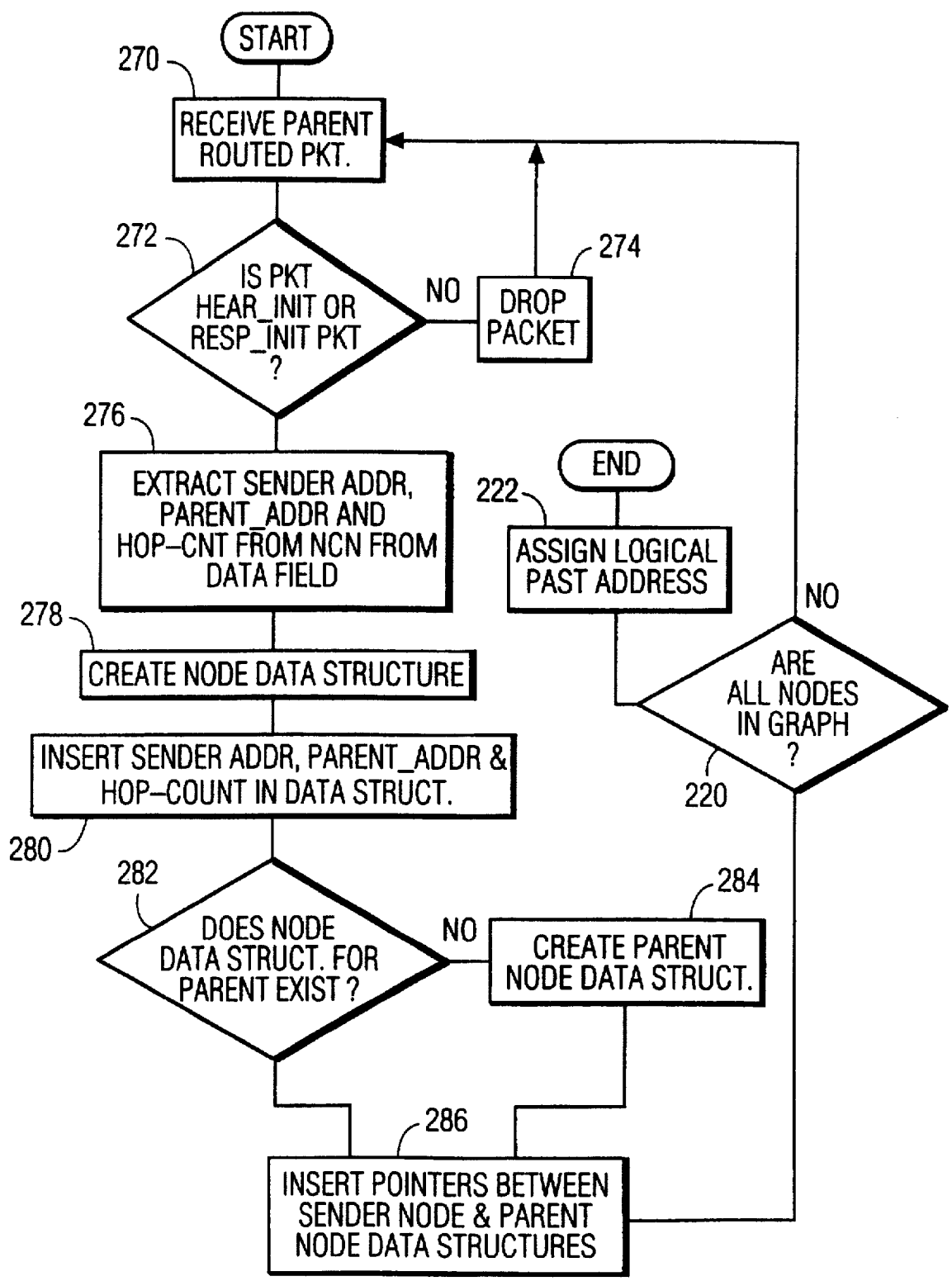
FIG. 14 is a flowchart of a graph creation process performed by the network control node.

The process 218 (see FIG. 9) of building the graph is illustrated in more detail in FIG. 14. When a packet is received by the NCN 60 it is checked 272 to determine the type of packet (130 or 260) and if it is the wrong type it is discarded 274. If the correct type of packet has been received the sender and parent addresses are extracted 276 and used to create 278 a linked list data structure list entry that will be discussed in more detail with respect to FIGS. 15(a) and 15(b) into which the data is inserted 280. The NCN 60 then determines 282 whether the entry in the linked list for the parent exists. If not the entry for the parent is created 284. Next, the pointers between the entries are inserted 286 into the entries. Then the steps 220 and 222 previously discussed with respect to FIG. 9 are performed.

Figures 15A, 15B:
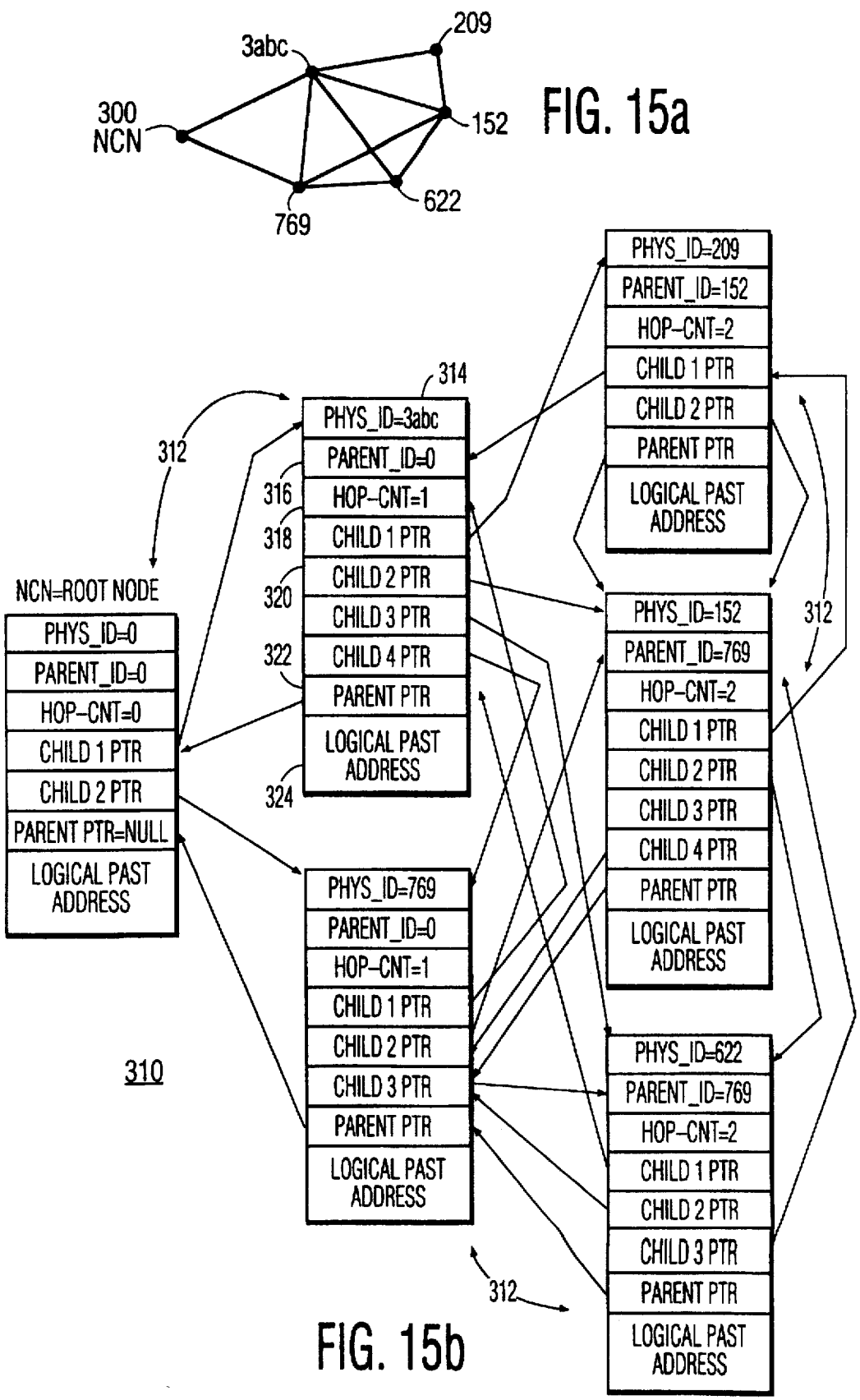
FIG. 15(a) depicts a network of nodes.
FIG. 15(b) depicts a data structure representing the network of FIG. 15(a)

The process of building the graph continues until the NCN 60 receives response packets (130/260) from each of the resource starved nodes 62–76 in the network and thus is able to represent every node and link in the network. The graph that results is like that of FIG. 2 and is represented in memory as a linked list such as illustrated in FIGS. 15(a) and 15(b). FIG. 15(a) depicts an NCN 300 that can communicate with nodes that have physical identifiers (IDs) 3abc and 769. Node 3abc can communicate with nodes having IDs 209, 152, 622 and 622 as well as node 769 and the NCN 300. Node 769 can communicate with nodes having IDs 152 and 622 as well as 3abc and the NCN 300 but not with 209. The nodes having IDs 209, 152 and 622 can hear and send to the nodes as indicated by the graph connections. This arrangement is reflected in the pointer directed linked list data structure 310 of FIG. 15(b). As can be seen each item or entry 312 in the list 310 includes a physical ID field 314 containing the physical ID of the corresponding node, a parent ID field 316 that identifies the parent node, a hop count field 318 that includes the count of the number of hops to the root node or NCN, one or more child pointer fields 320 that identify the nodes further down in the network that the current node can hear and communicate with and which sent packets 260, and a parent pointer 322 that identifies the first node that sent the current node an initialization packet 120. Each entry 312 also includes a field 324 storing the PAST address which will be assigned to the corresponding node. This type of graph is used by the network control node (NCN) in the next phase of the initialization to construct a spanning tree and assign addresses to the nodes of the spanning tree.

The next phase in initializing the network consists of deriving a separate spanning tree data structure (graph) from the original graph that is built in the NCN's memory. The spanning tree graph is built as a separated graph (linked list data structure) and the original graph is maintained for future network changes and additions. The process includes a modified depth first search of the graph of figure. In a depth first search a node (right most) is selected if it has children one of its children (right most) is selected, if it has children it is selected and so on until a leaf is encountered. At which point the siblings of the parent of the leaf node are depth first searched. In this type of search the process goes as deep as possible along one path before other paths are processed. In a breadth first search all nodes (siblings) at each level in the network are processed before nodes in a deeper level are processed. In the modified depth first search of the present invention the breadth of each level is minimized by an operation that can divide a level into two levels to help optimize the length of the resultant address. In this discussion FIG. 2 will be used as the original or source graph. No resource-starved nodes are involved in this phase, and this entire phase takes place within the NCN's memory. Because this is a recursive operation in which several things are happening (creation of spanning tree and address assignment) and is not easily represented by flow charts an Appendix including a code algorithm is provided herewith. The NCN 60 starts by considering itself the root of the spanning tree, and calculates its number of neighbors by adding one to the actual number of neighbor nodes in the graph. For example, NCN 60 has two neighbors so three is the calculated number of neighbors. If the calculated number of neighbors is a power of two, then each neighbor node is entered as a child node in the spanning tree. In the current example it is not. If the number of neighbors is not a power of two, then some of the neighbor nodes may or may not be excluded from being children nodes in the spanning tree. To decide this, the NCN 60 calculates the largest power of two, denoted by ↓2, less than the number of neighbors, and the smallest power of two, denote by ₒ2, greater than the number of neighbors. If the number of neighbors is closer ₒ2 than to ↓2, then all the neighbor nodes are entered as children in the spanning tree. If, however, the number of neighbors is closer to ↓2, then the NCN 60 tries to determine which of the neighboring nodes in the graph can be excluded from being children nodes in the spanning tree. In the case of a tie in the closeness of the number of neighbors to ₒ2 and ↓2, the NCN 60 decides to exclude some neighbors. For this determination, the NCN follows the arcs of the graph to see if any of the neighbor nodes are reachable from one of the other neighbors. In the current example node 62 is reachable from node 64. Any neighbor that can be reached from any other neighbor node is not entered as a child in the spanning tree and the number of neighbors is reduced by 1. As soon as the number of neighbors reaches ↓2 the exclusion process stops for the current node's neighbors. These excluded neighbors will be entered into the spanning tree in the future. If the NCN 60 determines that no neighbors can be excluded from being considered as children nodes in the spanning tree, then all the neighbors are entered into the tree. Each neighbor that is entered into the spanning tree is marked as visited, and the above procedure is performed again starting at each entered neighbor, thus building a spanning sub-tree rooted at the neighbor. If a neighbor is found to be marked as visited, that indicates that a spanning subtree rooted at the visited node already exists. The process continues further with the next neighbor that has not yet been visited.

The reason behind the extra effort to exclude some neighbors from being a child in the spanning tree if the number of neighbors is not close to ₒ2, is to keep the breadth of the spanning tree to a minimum. This will be better understood when the process of assigning logical PAST addresses is described below.

Figure 16:
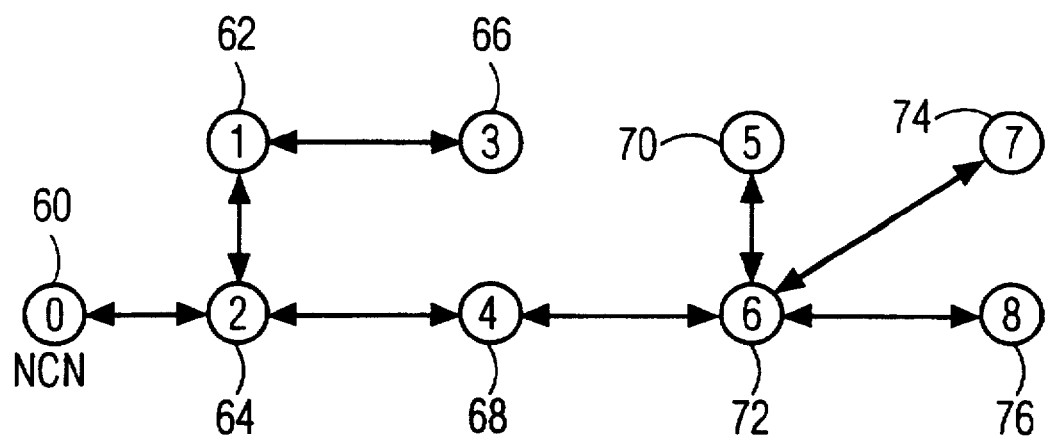
FIG. 16 depicts a spanning tree of the network of FIG. 2.

At the end of this phase, there exists in the NCN's memory, a spanning tree 330, separate from the original graph, (see FIG. 2), that is rooted at the NCN 60, and in which a single path exists from the NCN 60 to every node in the network and back as illustrated in FIG. 16. Note this graph is represented by a data structure like that of FIG. 15(b). All nodes (62–76), except the NCN 60, have a parent node which is one hop closer to the NCN 60. All nodes, except the leaf nodes (66,70,74 and 76), have children nodes that are one hop further away from the NCN 60. A node may or may not have a sibling node with which it shares a parent. Other spanning trees for FIG. 2 are of course possible.

In the final phase of the network initialization process of logical partitioned spanning tree (PAST) addresses are assigned to each node in the network. In this assignment scheme each child inherits the address of its parent which is combined with its own unique address at its level. To do this, the NCN 60 starts by assigning itself an address consisting of all zero bits (the length of this address will be decided based on the assignment of addresses to the resource-starved nodes and the length will be the same as that of the addresses of the leaf nodes 66,70,74 and 76 of the spanning tree) The NCN 60 then calculates the number of children by adding one to the actual number of children nodes in the spanning tree of the NCN 60. In the current example this would be two. The minimum number of bits, say n, required to address each child node uniquely is then calculated. If any neighbor nodes were excluded as children during the construction of the spanning tree, then ₒ2 should be the power of two raised to the number of bits calculated here. If no neighbor nodes were left out, then the number of bits ought to lead to ↓2, or to a power of two that was exactly equal to the number of neighbors in the graph. In the example of FIG. 16 this would be a single bit. The logical PAST address assigned to each child node consists of a unique n-bit pattern that distinguishes it from all other children nodes. These n-bits are referred to as the most significant PAST bits.

After assigning the PAST address to its children in the spanning tree of the NCN 60, the NCN 60 then continues the above procedure with the sub-trees rooted at each child node. The k most significant PAST bits of any node in the spanning tree comprises the n most significant PAST bits of its parent node in the tree, concatenated with a unique m-bit pattern, where m is the least number of bits needed to uniquely address each sibling. Thus, addresses of siblings differ only in the m least significant bits. Zero bits are used as pads to the right of the k-bit PAST address to make every node's address appear to be of the same length.

Figure 17:
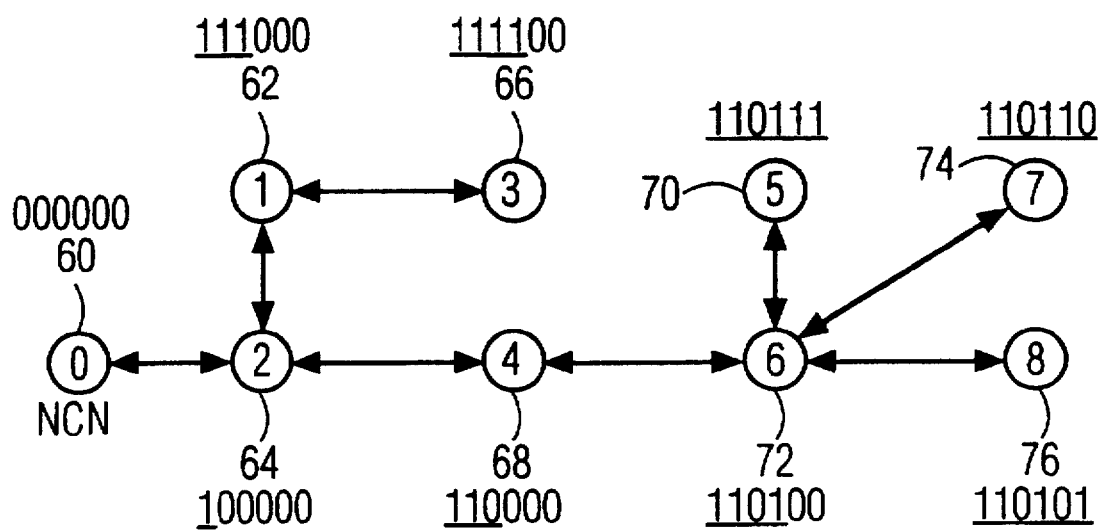
FIG. 17 illustrates the addresses assigned to the nodes of the network of FIG. 17 in accordance with the present invention.

The results of this procedure are illustrated in FIG. 17 where the most significant PAST bits are marked with a solid underscore. The zero bits used to pad each PAST address to the same length, have no underscore. In FIG. 17 since the leaf node 76 requires six bits for its address all node addresses are padded with zeros to obtain a six bit address. As can be seen by examining FIG. 17 each child node includes the most significant bits of the childs parent.

As previously discussed, once each node has an address the addresses are sent by the network control node (NCN) 60 to the resource starved nodes 62–76 and stored in the PROM therein. This ends the initialization phase.

Figure 18:
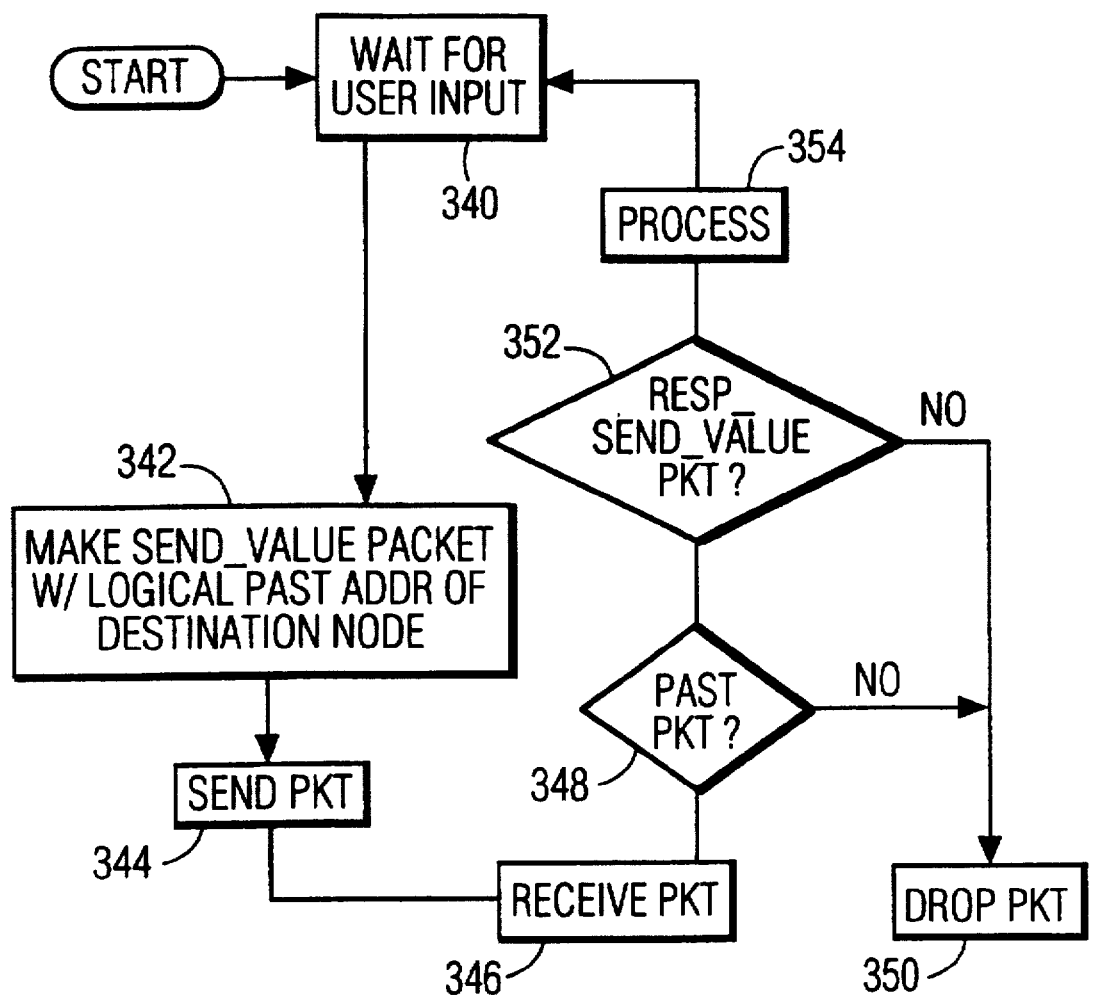
FIG. 18 depicts a monitor and control process of the network control node.
Figure 19:
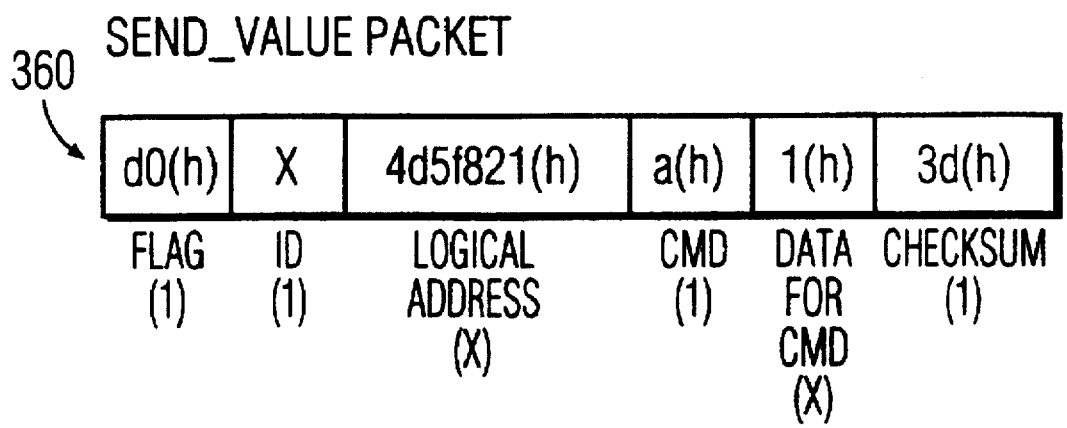
Figure 20:
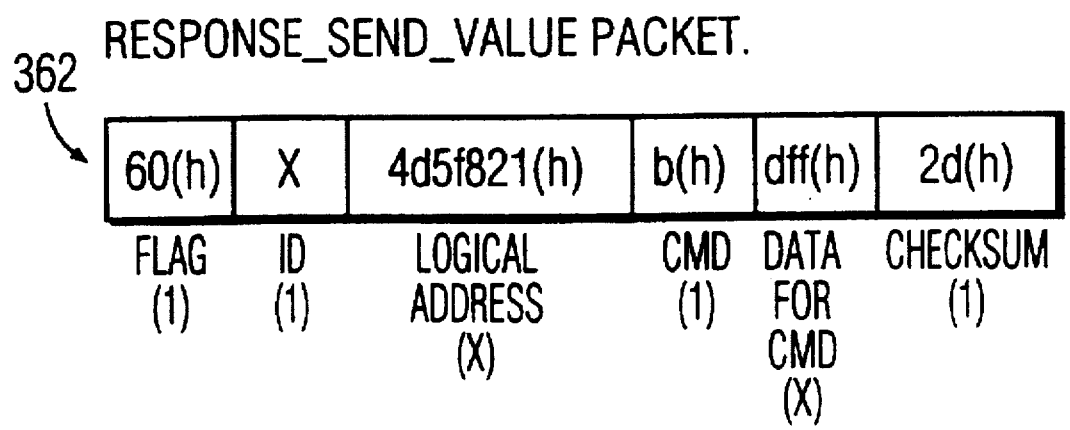

During the monitor and control phase, as illustrated in FIG. 18, the NCN 60 waits for an input 340 from the user. To instruct (command) a node to perform an operation, such as to perform a specific operation, or to query the node and ask it to return back any information, the NCN 60 constructs 342 a SEND_VALUE packet 360, as illustrated in FIG. 19, with an appropriate command therein. This packet 360 is sent 344 and the NCN 60 waits 346 for a return packet. The receiving node, once the operation is performed or query completed, returns the results using a RESPONSE_SEND_VALUE packet 362 as illustrated in FIG. 20. This packet is examined 348 to determine whether it is a packet routed using the PAST protocol and the NCN 60 discards 350 the packet if it is not. The NCN 60 also determines 354 whether the packet is the response packet 362 and if so processes the packet 362 accordingly, such as by updating a display or a device status.

After receiving and storing a logical PAST address at the end of the initialization phase, each node (62–76) is capable of routing packets whose flag bytes indicate that they are to be routed using the partitioned spanning tree (PAST) protocol. During the monitor and control phase for packets travelling downstream from the NCN 60, each packet is routed using PAST, and contains the PAST address of the destination node, for example 110111 when node 70 is the destination node. Packets travelling upstream to the NCN contain the PAST address of the sender node, for example 111000 if node 62 is the source node. An intermediate node, as illustrated in FIG. 21, upon receiving 370 a packet, determines 372 whether the packet is being routed using the correct protocol. If the protocol is correct the packet address is compared 376 to the node address. If there is not a match the node compares 378 the k most significant bits of its own PAST address with the PAST address in the packet (the destination or sender node's PAST address, for downstream and upstream packets respectively). If all k bits match in the two addresses, then the intermediate node definitely lies in a direct path from the NCN 60 to the destination/sender node. The intermediate node therefore retransmits 380 the packet to forward it. All other recipients of the packet, whose PAST addresses do not have a k-bit match with the packet's address, refrain from retransmitting the packet and discard it 382. If the destination address matches the node address the packet is processed 384 and the command therein is executed. Based on the particular process executed, the results are placed 386 in a RESPONSE_SEND_VALUE 362 (see FIG. 20) and this packet 362 is sent. If the routing protocol is not the PAST protocol, the node determines 390 whether the protocol is the flooding with hop counts protocol (FHC), if not the packet is dropped 391. If the packet is an FHC packet, a determination 392 is made whether the packet is an INSERT packet (see FIG. 22). If not a determination 394 is made as to whether the packet is an INIT packet 120 (see FIG. 5). If it is, the node enters 396 the initialization phase. If the packet is an INSERT packet, the node makes a HEAR_INSERT packet 401 (see FIG. 23) which is then sent 380.

After a network has been initialized, i.e., all resource-starved nodes have received their logical PAST addresses, it may be necessary to add a new resource-starved node to the network. The simplest solution is to have the entire network reinitialized as described above. However, this may be undesirable in many circumstances. As an alternative solution, each new resource-starved node, can broadcast an INSERT packet 400 (see FIG. 22). This packet is heard by its neighbor nodes (which have already been initialized). The neighbors create a HEAR_INSERT packet 401 (see FIG. 23) and send it to the NCN 60 using the PAST protocol. The HEAR_INSERT packets contain the physical ID of the new node, and the ID of the node that created the packet, along with its hop-count to the NCN 60. The NCN 60, after collecting HEAR_INSERT packets from multiple neighbors of the new node, tries to select the best location for the new node in the spanning tree. A good location is one where a logical PAST address can be assigned to the new node with little or no change to the PAST addresses or length of PAST addresses of other nodes. In the example of FIG. 17, a new node can be easily inserted into the spanning tree as a child of the node with physical ID 2 (node 64). Any other placement will require a change in logical PAST addresses of other nodes. Thus, if a new node were to require insertion in the neighborhood of node 64, then the NCN would assign a logical PAST address of 101000 to this new node. However, if a new node were to require insertion outside of neighborhood of node 64, some of the logical PAST addresses would be required to be changed to accommodate the new node's PAST address. It may be necessary for the NCN 60 to reassign new PAST addresses to all or many of the nodes. The changed PAST address of nodes, and the new PAST address of the new node, are disseminated using the SET_ADDRS packets and sent using FHC routing. If required, the NCN 60 may start the entire initialization procedure.

End-to-end acknowledgments are used in the present invention to detect node failures. If the NCN 60 sends a request or query for information to a node, and it does not receive a response back, it assumes that a node in the path to the destination may have failed. It then starts to traverse down the path in the spanning tree that leads to the destination node, and sequentially sends an ECHO (see FIG. 24) packet 402 using PAST protocol to each node in the path and awaits for a PAST protocol response. A node that receives an ECHO packet 402, simply copies it back to the NCN 60, thus notifying the NCN 60 that the node is in proper working condition. Failure to receive a response to an ECHO packet 402 indicates to the NCN 60 that the node addressed by the ECHO packet 402 is down. The NCN 60 then reconfigures the spanning tree to connect the spanning subtree, rooted at the failed node, to a different part of the network such that the new parent of the subtree is within hearing range of all the new children. This reconfiguration is performed by eliminating the arc from the parent node to the down node in the original graph and performing the spanning tree and address assignment operations previously described. The NCN 60 may have to break up parts of the subtree to ensure that all nodes in the subtree are reconnected to other parts of the spanning tree. The NCN 60 then assigns new logical PAST addresses to the reconfigured parts of the spanning tree and sends out packets 240 to notify the affected nodes about the changes in their PAST addresses. Again, a complete reinitialization of the network may be required if the failed node lies in a critical part of the network.

An implicit hop-by-hop acknowledgment (IHBH) scheme used in the present invention also helps in detecting node failures. Each source or intermediate node that transmits a packet, expects to hear the packet being retransmitted by one of its neighbors (a node in the same path in the spanning tree). If within a specified period of time, no retransmissions are heard, then the source or intermediate node assumes that node failures are preventing its packets from traversing the path of the spanning tree. The source or intermediate node then sends out a SQUEAL packet 404 (see FIG. 25) that has its broadcast bits in the FLAG byte set appropriately. A SQUEAL packet 404 contains the PAST address of the sending node, and is routed to the NCN 60 using the flooding with hop counts protocol. The NCN 60 then starts its procedure to discover which node along the path to the complaining node is down. A reconfiguration of part or all of the network follows.

The many features and advantages of the invention are apparent from the detailed specification and, thus, it is intended by the appended claims to cover all such features example, the packet structures described above can be changed as long as the functionality of the data elements in each packet is provided by similar other fields in a new packet format. The algorithm executed at the NCN and used to generate PAST addresses for the nodes can be changed as long as any new algorithm is able to generate PAST addresses with bit fields that uniquely identify each node's children nodes. All nodes do not need to be resource-starved in terms of memory and processing power, the protocol works for any type of nodes. The PAST protocol does not restrict the network to communication between only the NCN and each nodes, and back, but can also be used for communication between non-NCN nodes. Communication between two non-NCN nodes can be achieved by sending packets to the NCN first, which in turn can send them to the appropriate destination. The discussion describes a minimization of the breadth of the spanning tree using powers of two. This minimization need not be performed and is provided to optimize the length of the PAST addresses. The linked-list data structure used to represent the graph in the NCN, can be replaced with any other type of data structure (e.g. array) and the order of the elements of the linked-list data structure can be changed as long as the functionality of each element is fulfilled with new or newly ordered elements.

APPENDIX

```
Node root : /* Root of the Spanning Tree */
Procedure Assign_addresses( ) {
        int bits_assigned = 0 ;
        Addr root_address = 0 ;
        Assign_subtree_addresses(root, root_address. bits_assigned) ;
}
/* This function assigns address bits to each child of the given
    node, and concatenates the assigned bits to this node's address
    in order to generate the address of the child */
Procedure Assign_subtree_addresses(Node N, Addr this_node_addr_bits,
                                    int this_node_signif_bits_used) {
        int num_childs ;
        int num_bits_reqd. ;
        Addr child_addr ;
        if (N is marked as visited)
                return ;
        else
                (mark N as visited) ;
/* Calculate the least number of bits required to uniquely
        address the children of N */
for (each child C of N) {
        for (each child D of N) {
                if (C can be reached from D)
                        (drop C from set of children of N) ;
        } /* end for */
} /* end for */
num_childs = (Number of remaining children of Node N) ;
num_bits_reqd = (least number of bits needed to uniquely address num_childs children) ;
bit_pattern = (highest binary number of num_bits_reqd bits) ;
for (each remaining child C of N) {
        child_addr = (this_node_addr_bits concatenated with bit_pattern) ;
        bit_pattern = bit_pattern -1 ;   /* get a new unique no. for next child */
        */ Next work on the subtree emanating from each child */
        Assign_subtree_addresses( C. child_addr. this_node_signif_bits_used + num_bits_reqd) ;
        } /* end for */
} /* end Procedure */
``` and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention. For

What is claimed is:

1. A method for routing data packets in a network that includes a plurality of nodes, including the steps of:
    assigning a logical address to each of the nodes; and,
    instructing each of the nodes, upon receipt of a data packet, to compare its respective logical address with a message address contained in the received data packet, and to discard, process, or transmit the received data packet solely on the basis of this comparison, and without using a routing table.

2. The method as set forth in claim 1, wherein the assigning step is performed by using a partitioned spanning tree protocol.

3. The method as set forth in claim 1, wherein the network comprises a packet-hopping wireless network.

4. The method as set forth in claim 1, wherein prescribed bits of the logical address assigned to each node comprise an address of a parent node.

5. The method as set forth in claim 1, wherein the instructing step includes the sub-steps of:

instructing each node, upon receipt of a data packet:
- to compare all bits of the message address contained in the received data packet with all bits of its logical address and to process the received data packet if a match is detected and,
- if a match is not detected, to compare prescribed bits of the message address with corresponding prescribed bits of its logical address and to transmit the received data packet if a match is detected.

6. The method as set forth in claim 5, wherein the prescribed bits of the logical address comprise an address of a parent node.

7. The method as set forth in claim 1, wherein the message address contained in the received data packet includes a routing logical address that includes all routing information necessary to route the received data packet from a sending node to a destination node along a communication path prescribed by the routing logical address.

8. The method as set forth in claim 7, wherein the received data packet includes:

a direction bit that indicates the direction which the received data packet must travel to reach the destination node;

a first set of bits that includes a hops value which indicates a number N of hops required to transfer the received data packet from the sending node to the destination node, and a number of hops count;

a second set of bits that includes the routing logical address; and, a third set of bits that includes processing instructions for the destination node.

9. The method as set forth in claim 8, wherein each of the nodes is programmed to increment the number of hops count if the received data packet is to be re-transmitted by that node and if the direction is a first direction, and to decrement the number of hops count if the received data packet is to be re-transmitted by that node and if the direction is a second direction.

10. The method as set forth in claim 7, wherein the plurality of nodes includes a network control node and a plurality of other nodes.

11. The method as set forth in claim 10, wherein the network control node performs the assigning step.

12. The method as set forth in claim 11, wherein the instructing step is performed by software resident in each of the other nodes.

13. The method as set forth in claim 1, wherein one of the plurality of nodes is a network control node that performs the steps of:

initializing the network in order to obtain nodal connectivity information; and, logically organizing the network on the basis of the nodal connectivity information obtained during the initializing step, using a partitioned spanning tree protocol.

14. The method as set forth in claim 1, wherein the plurality of nodes includes a network control node and a plurality of other nodes that each contain ten bytes or less of memory.

15. The method as set forth in claim 1, wherein the plurality of nodes includes a network control node and a plurality of other nodes that each contain memory resources that are insufficient to store a routing table.

16. A network, including:

a plurality of nodes, including a network control node and a plurality of other nodes;

wherein the network control node is programmed to assign a logical address to each of the other nodes; and, wherein each of the other nodes is programmed to compare its respective logical address with a message address contained in a received data packet, and to discard, process, or transmit the received data packet solely on the basis of this comparison, and without using a routing table.

17. The network as set forth in claim 16, wherein the network control node is programmed to assign the logical addresses to each of the other nodes using a partitioned spanning tree protocol.

18. The network as set forth in claim 16, wherein the network comprises a packet-hopping wireless network.

19. The network as set forth in claim 16, wherein prescribed bits of the logical address assigned to each node comprise an address of a parent node.

20. The network as set forth in claim 16, wherein each of the other nodes contain memory resources that are insufficient to store a routing table.

* * * * *